(12) United States Patent
Soryal et al.

(10) Patent No.: US 11,218,491 B2
(45) Date of Patent: Jan. 4, 2022

(54) SECURITY DE-ESCALATION FOR DATA ACCESS

(71) Applicant: AT&T Intellectual Property I, L.P., Atlanta, GA (US)

(72) Inventors: Joseph Soryal, Ridgewood, NY (US); Naila Jaoude, Eatontown, NJ (US); Dylan C. Reid, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 223 days.

(21) Appl. No.: 16/712,461

(22) Filed: Dec. 12, 2019

(65) Prior Publication Data
US 2021/0185051 A1 Jun. 17, 2021

(51) Int. Cl.
*H04L 29/06* (2006.01)
*G06F 21/62* (2013.01)

(52) U.S. Cl.
CPC ............ *H04L 63/105* (2013.01); *G06F 21/62* (2013.01); *H04L 63/08* (2013.01); *G06F 2221/2113* (2013.01); *G06F 2221/2137* (2013.01)

(58) Field of Classification Search
CPC ..... H04L 63/105; H04L 63/08; H04L 63/083; G06F 21/62; G06F 2221/2137; G06F 2221/2113; G06F 21/6218
See application file for complete search history.

(56) References Cited

U.S. PATENT DOCUMENTS

| | | | |
|---|---|---|---|
| 6,289,457 B1* | 9/2001 | Bishop | G06F 21/00 726/21 |
| 6,889,210 B1* | 5/2005 | Vainstein | G06F 21/6209 380/201 |
| 7,555,558 B1* | 6/2009 | Kenrich | H04L 67/06 709/203 |
| 8,984,027 B1* | 3/2015 | Patwardhan | G06F 16/119 707/809 |
| 10,095,425 B1* | 10/2018 | Martin | G06F 3/0665 |
| 10,505,959 B1* | 12/2019 | Wang | G06N 20/00 |
| 10,671,309 B1* | 6/2020 | Glynn | G06F 3/0647 |
| 10,755,371 B1* | 8/2020 | Sarpy, Sr. | G06Q 50/265 |
| 2003/0196108 A1* | 10/2003 | Kung | H04L 63/105 726/6 |
| 2006/0218639 A1* | 9/2006 | Newman | G06F 21/46 726/25 |

(Continued)

*Primary Examiner* — Aravind K Moorthy
(74) *Attorney, Agent, or Firm* — Hartman & Citrin LLC (57) ABSTRACT

The concepts and technologies disclosed herein are directed to security de-escalation for data access. A user device can define a security de-escalation rule. The user device can define a multi-tiered security zone within a user device file system utilized by a memory of the user device. The multi-tiered security zone can include a plurality of security tiers. The user device can identify data for de-escalation in accordance with the security de-escalation rule. The user device can de-escalate the data to generate de-escalated data by storing the data identified for de-escalation in a less secure security tier of the plurality of security tiers of the multi-tiered security zone. The user device can receive a data access request from an external user device. The user device can verify a data access credential contained in the data access request. The user device can provide the de-escalated data to the external user device.

20 Claims, 6 Drawing Sheets

(56) References Cited

U.S. PATENT DOCUMENTS

| | | | |
|---|---|---|---|
| 2011/0119407 A1* | 5/2011 | Shah | G06F 9/5011 710/6 |
| 2011/0162050 A1* | 6/2011 | Krajna | H04L 63/166 726/4 |
| 2012/0137140 A1* | 5/2012 | Berengoltz | H04N 21/4436 713/189 |
| 2014/0082745 A1* | 3/2014 | Guedalia | G06F 3/0481 726/27 |
| 2014/0115029 A1* | 4/2014 | Baldwin | H04L 63/105 709/203 |
| 2014/0281550 A1* | 9/2014 | Resch | G06F 21/6218 713/171 |
| 2015/0350250 A1* | 12/2015 | Brander | H04L 63/205 726/1 |
| 2016/0156664 A1* | 6/2016 | Nagaratnam | H04W 12/06 726/1 |
| 2016/0203336 A1* | 7/2016 | Nambiar | G06F 21/6254 726/26 |
| 2017/0024551 A1* | 1/2017 | Phadke | G06F 21/16 |
| 2017/0171152 A1* | 6/2017 | Cismas | H04L 63/0209 |
| 2017/0171207 A1* | 6/2017 | Kurian | H04L 63/0209 |
| 2017/0220806 A1* | 8/2017 | Munoz | G06F 21/577 |
| 2017/0329998 A1* | 11/2017 | Herrell | G06F 3/0622 |
| 2019/0020687 A1* | 1/2019 | Noon | G06F 21/606 |
| 2019/0050417 A1* | 2/2019 | Ellis | G06F 21/6209 |
| 2019/0109857 A1* | 4/2019 | Caffary, Jr. | H04W 12/069 |
| 2019/0289038 A1* | 9/2019 | Li | H04L 63/0227 |

* cited by examiner

SECURITY DE-ESCALATION FOR DATA ACCESS

BACKGROUND

Data, in all its forms, requires security mechanisms to ensure only authorized entities are allowed access. The sensitivity of the data often dictates the security mechanism(s) used. There are times, however, when even the most sensitive data in one context is less sensitive in another, and therefore should be treated differently for both contexts. Moreover, the accessibility of certain data is often hampered by excess security measures that are above and beyond what is necessary, and this can make data access a frustrating endeavor for certain users.

SUMMARY

Concepts and technologies disclosed herein are directed to security de-escalation for data access. According to one aspect of the concepts and technologies disclosed herein, a user device can define a security de-escalation rule. The user device can define a multi-tiered security zone within a user device file system utilized by a memory of the user device. The user device can define the multi-tiered security zone within the user device file system utilized by the memory in accordance with one or more security rules. The multi-tiered security zone can include a plurality of security tiers. The user device can identify data associated with a second security tier of the plurality of security tiers for de-escalation in accordance with the security de-escalation rule. The user device can de-escalate the data associated with the second security tier to generate de-escalated data by storing the data identified for de-escalation in a first security tier of the plurality of security tiers of the multi-tiered security zone. The first security tier can be less secure than the second security tier. The user device can receive a data access request from an external user device. The data access request can include a data access credential. The user device can verify the data access credential and can provide de-escalated data to the external user device.

In some embodiments, the user device can define a security re-escalation rule. The user device can implement the security re-escalation rule to re-escalate the de-escalated data from the first security tier to the second security tier.

In some embodiments, the user device can receive the data access request from the external user device via a network. Alternatively, the user device can receive the data access request from the external device via a cloud network. The user device also can receive the data access request from the external device via the peer-to-peer connection. The user device can provide the de-escalated data to the external user device via the network, the cloud network, or the peer-to-peer connection.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, vehicles, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of the concepts and technologies disclosed herein for venue seat assignment based upon hearing profiles will be described.

Figure 1:
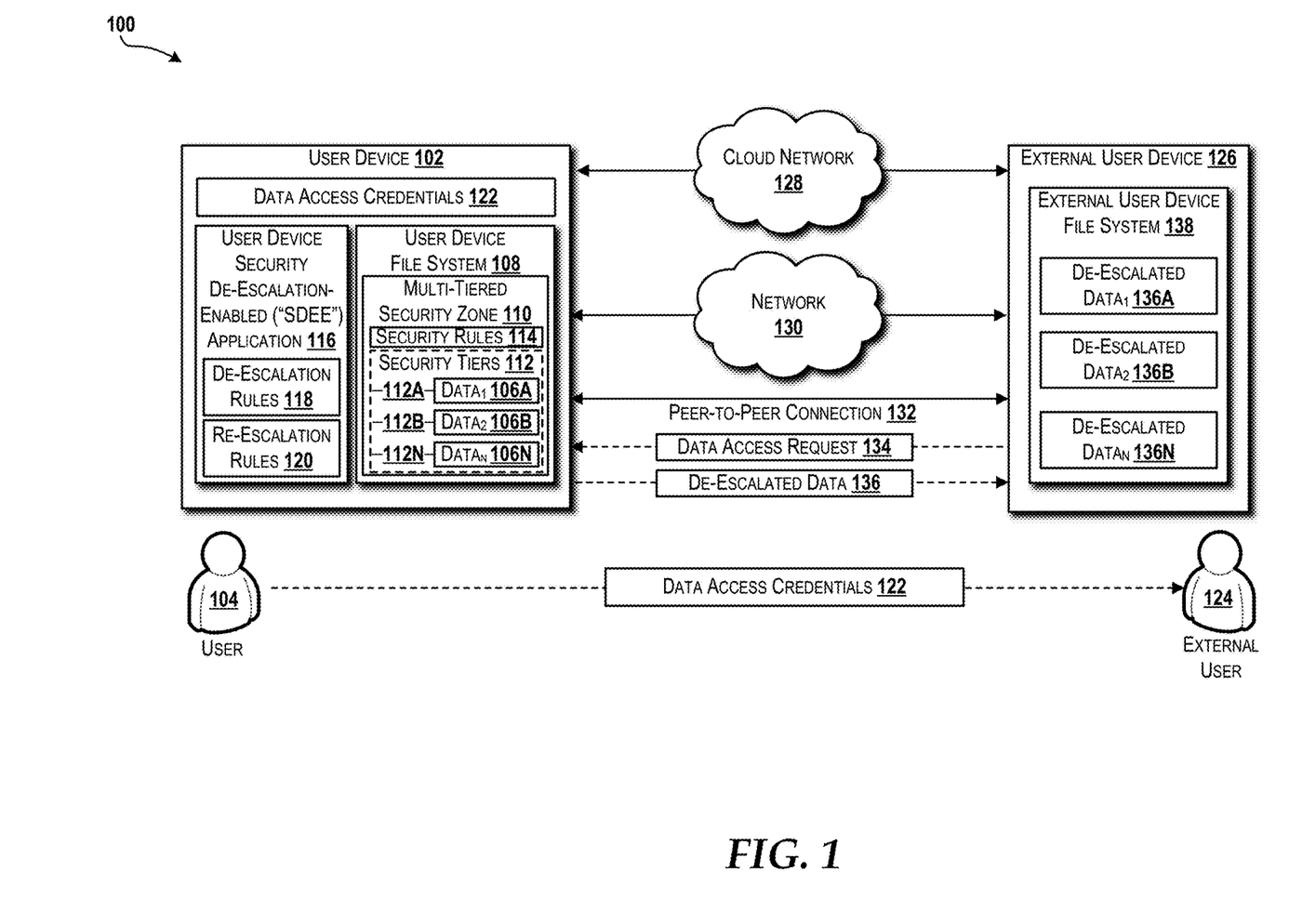
FIG. 1 is a block diagram illustrating aspects of an illustrative operating environment for various concepts disclosed herein.

Referring now to FIG. 1, aspects of an illustrative operating environment 100 for various concepts disclosed herein will be described. It should be understood that the operating environment 100 and the various components thereof have been greatly simplified for purposes of description. Accordingly, additional or alternative components of the operating environment 100 can be made available without departing from the embodiments described herein.

The illustrated operating environment 100 includes a user device 102 associated with a user 104. The user device 102 contains data 106A-106N stored in a user device file system 108, and in particular, in a multi-tiered security zone 110 of the user device file system 108. The multi-tiered security zone 110 contains a plurality of security tiers 112. In the illustrated example, a first security tier 112A contains first data 106A, a second security tier 112B contains second data 106B, and an Nth security tier 112N contains N[th] data 106N. The multi-tiered security zone 110 may contain any number of security tiers 112, and each security tier 112 may contain any type of data 106. Each of the security tiers 112 can be associated with one or more security rules 114 that govern the level of security provided to the data 106 contained in that tier. For example, the first security tier 112A can provide a first level of security to the data contained in that tier, the second security tier 112B can provide a second level of security to the data contained in that tier that is more secure than the first level of security provided by the first security tier 112A, and the Nth security tier 112N can provide an Nth level of security to the data contained in that tier that is more secure than both the first and second levels of security provided by the first security tier 112A and the second security tier 112B, respectively.

The illustrated user device 102 can execute, via one or more processors (best shown in FIGS. 3 and 4), a user device security de-escalation-enabled ("SDEE") application 116. The SDEE application 116 can be any application that creates, modifies, or otherwise interacts with the data 106 and causes the data 106 to be stored in the multi-tiered security zone 110. In some embodiments, the SDEE application 116 is a standalone application. In some other embodiments, the SDEE application 116 is provided as part of an operating system (best shown in FIGS. 3 and 4). The SDEE application 116 contains one or more de-escalation rules 118 and one or more re-escalation rules 120. The security de-escalation rules 118 allow the SDEE application 116 to de-escalate the data 106 from one security tier 112 to another. For example, the SDEE application 116 may generate the second data 106B that is typically stored in the second security tier 112B. The second security tier 112B may be governed by one or more of the security rules 114 that permit read-only access. The security de-escalation rule(s) 118 can define when the second data 106B can be de-escalated to a lower security tier, such as the first security tier 112A, that may permit read and write access. The security de-escalation rules 118 may be temporal such that the second data 106B is de-escalated for a specific time period, the expiration of which causes the second data 106B to be re-escalated to a higher security tier, such as back to the second security tier 112B or higher in accordance with the security re-escalation rule(s) 120.

Access to the data 106 can be governed by one or more data access credentials 122. The user 104 may, from time to time, desire to grant others, such as one or more external users 124, access to the data 106 stored in the multi-tiered security zone 110 of the user device file system 108. The data access credentials 122 can include any credentials used by the user device 102 to authenticate access to the data 106. The data access credentials 122 can be associated with one or more specific security tiers 112 such that the user 104 can provide the data access credentials 122 to the external user(s) 124 to allow the external user(s) 124 authenticated access to the data contained in the corresponding security tier(s) 112. As the data 106 is de-escalated in accordance with the security de-escalation rule(s) 118, the external user(s) 124 may be granted temporary access to previously higher tiered data 106. For example, if the data access credentials 122 grant access to the first security tier 112A, the second data 106B and the Nth data 106N that typically reside in the second security tier 112B and the Nth security tier 112N, respectively, but have been de-escalated in accordance with the security de-escalation rule(s) 118, may be temporarily accessible from the first security tier 112A until the security de-escalation rule(s) 118 expire.

In the illustrated example, the user 104 shares the data access credentials 122 with the external user 124 who is associated with an external user device 126. The data access credentials 122 may be shared out-of-band, such as via a method that does not involve a cloud network 128, a network 130, and/or a peer-to-peer connection 132. The external user device 126 can generate and send a data access request 134 to the user device 102. The data access request 134 can include the data access credentials 122 and a request for at least a portion of the data 106 contained in the security tier 112 associated with the data access credentials 122. In response, the user device 102 can grant access to the data 106 contained in the security tier 112 associated with the data access credentials 122. This data is illustrated as de-escalated data 136A-136N. The external user device 126 can receive the de-escalated data 136 and store the de-escalated data 136 in an external user device file system 138. The de-escalated data 136 may contain an expiration timer derived from the security de-escalation rule(s) 118. Upon expiration of the expiration timer, the de-escalated data 136 may be no longer accessible by the external user device 126. Although the illustrated example shows the de-escalated data 136 being stored temporarily in the external user device file system 138, the de-escalated data 136 may be merely accessible but never locally stored.

The concepts and technologies disclosed herein are not limited to any particular type of device. As such, it is contemplated that the user device 102 and the external user device 126 may be any type of computing device or computing system that is associated with one or more users. Moreover, the user 104 and the external user 124 are described as human users, but instead may be robotic users, artificial intelligence, other computing devices or computing systems, businesses, or any other entities. The examples provided herein therefore are exemplary and should not be construed as being limiting in any way.

The de-escalated data 136 can be exchanged via the cloud network 128. The user device 102 may operate in communication with or as part of the cloud network 128. The external user device 126 may provide the data access request 134 to the cloud network 128 that then finds the user device 102 to facilitate an exchange of the de-escalated data 136. An example cloud computing platform 600 upon which the cloud network 128 can be based is illustrated and described with reference to FIG. 6.

The de-escalated data 136 can be exchanged via the network 130. The user device 102 may operate in communication with or a part of the network 130. The network 130 may be any network type and may use any network protocol to allow the user device 102 and the external user device 126 to exchange the data access request 134 and the de-escalated data 136. An example network architecture 500 upon which the network 130 can be based is illustrated and described with reference to FIG. 5.

The de-escalated data 136 can be exchanged via the peer-to-peer connection 132. The peer-to-peer connection 132 may be implemented using any peer-to-peer protocol over any distance. In some implementations, the peer-to-peer connection 132 uses a local or personal area network protocol such as BLUETOOTH, WI-FI peer-to-peer, and/or near-field communications. These protocols are merely exemplary and should not be construed as being limiting in any way.

Figure 2:
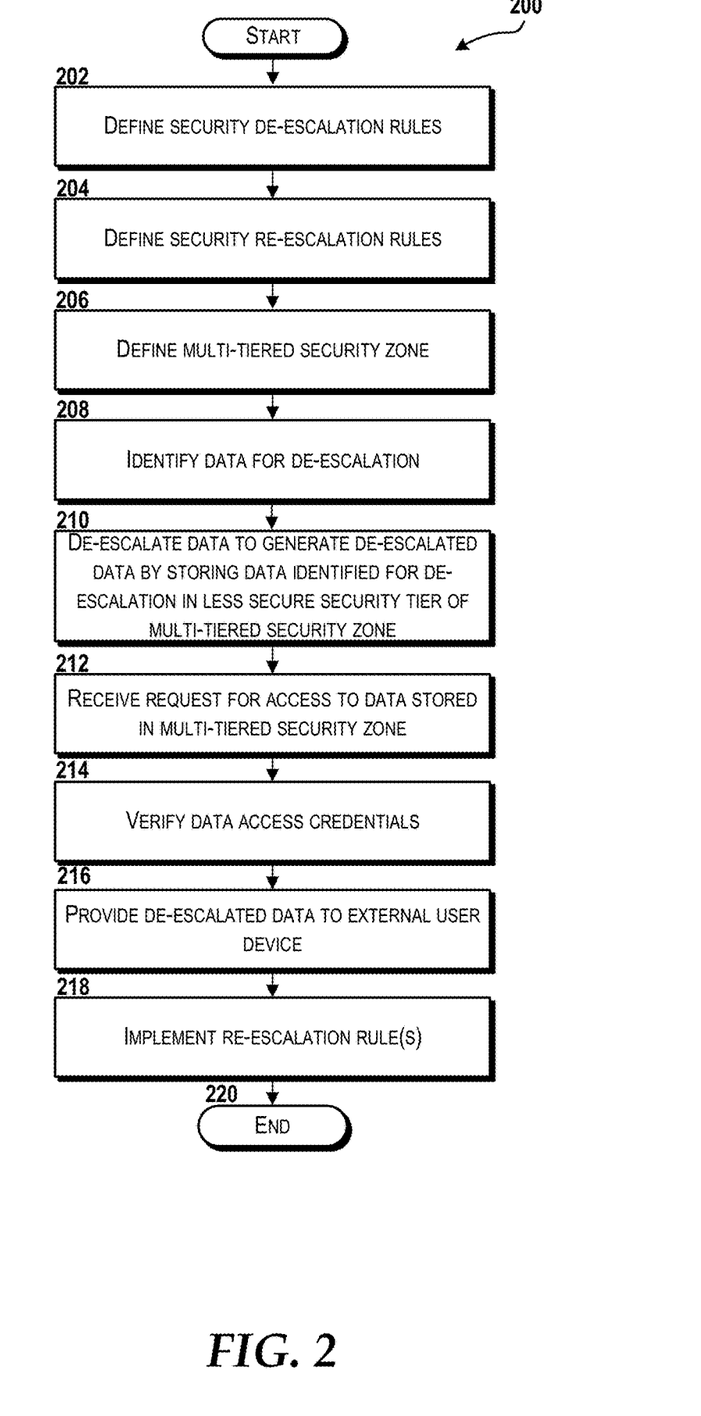
FIG. 2 is a flow diagram illustrating aspects of a method for security de-escalation, according to an illustrative embodiment.

Turning now to FIG. 2, a flow diagram illustrating aspects of a method 200 for security de-escalation will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems or devices, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors of the user device 102, the external user device 126, or components thereof, and/or one or more other computing systems, network components, and/or devices disclosed herein to perform operations.

For purposes of illustrating and describing some of the concepts of the present disclosure, the methods disclosed herein are described as being performed, at least in part, by the user device 102 and/or the external user device 126. It should be understood that additional and/or alternative devices can provide the functionality described herein via execution of one or more modules, applications, and/or other software. Thus, the illustrated embodiments are illustrative, and should not be viewed as being limiting in any way.

The method 200 will be described with additional reference to FIG. 1. The method 200 begins and proceeds to operation 202. At operation 202, the user device 102 defines the security de-escalation rules 118. The security de-escalation rules 118 can be defined based upon input provided by the user 104, who owns and/or operates the user device 102. The security de-escalation rules 118 can be defined based upon input provided by the manufacturer of the user device 102. The security de-escalation rules 118 can be defined based upon input provided by a service provider that provides a service, such as a mobile telecommunications service, to the user device 102. The security de-escalation rules 118 can be defined based upon input provided by a government entity. The security de-escalation rules 118 can be defined based upon input provided by an employer of the user 104. The security de-escalation rules 118 can be pre-defined in the SDEE application 116. New de-escalation rules 118 can be added as needed, modified as needed, and removed as needed. It is contemplated that the security de-escalation rules 118 may be governed by an entity other than the user device 102 such that such an entity can configure the security de-escalation rules 118 as needed and without prior approval by the user 104. Alternatively, approval by the user 104 may be required.

The security de-escalation rules 118 can be based, at least in part, on one or more other conditions. Other conditions may include location and/or time. For example, when the user 104 is at work, data typically in the second security tier 112B may be de-escalated to the first security tier 112A. The location can be determined by a location component of the user device 102. Geo-fence triggers and the like are also contemplated. An example location component is illustrated and described below with reference to FIG. 4.

In some embodiments, one or more of the security de-escalation rules 118 can be pre-configured for a future event (e.g., if the external user device 126 enters a certain geographical area, the external user device 126 can receive de-escalated data from certain senders, such as the user 104 via the user device 102). The security de-escalation rules 118 may be defined for specific applications, such as the SDEE application 116, or particular data types associated with specific applications. For example, if the user device 102 receives an email with picture attachments, the picture attachments can be de-escalated for access by friends and family (e.g., based upon a list of contacts maintained by or for the user device 102). The security de-escalation rules 118 may be associated with the SDEE application 116 embodied as anti-virus software, malware software, and/or other security software. For example, if anti-virus software is running on the user device 102 and detects no active threats, the data 106, or a portion thereof, can be de-escalated. In case of a connected system in which servers are connected to a physical security aspect (e.g., data center doors), if the doors are not open, then the data 106, or a portion thereof, can be de-escalated. Another example is when the user 104 returns home or to another "safe" location, and the data 106, or a portion thereof, can be de-escalated. As another example, when all the outgoing and incoming traffic on the user device 102 is from a well-known website (e.g., YAHOO, FACEBOOK, GOOGLE, etc.), the data 106, or a portion thereof, can be de-escalated and then re-escalated when at least some of the outgoing and incoming traffic on the user device 102 is from a lesser known (untrusted) website.

From operation 202, the method 200 proceeds to operation 204. At operation 204, the user device 102 defines the security re-escalation rules 120. The security re-escalation rules 120 can be defined based upon input provided by the user 104, who owns and/or operates the user device 102. The re-escalation rules 120 can be defined based upon input provided by the manufacturer of the user device 102. The security re-escalation rules 120 can be defined based upon input provided by a service provider that provides a service, such as a mobile telecommunications service, to the user device 102. The security re-escalation rules 120 can be defined based upon input provided by a government entity. The security re-escalation rules 120 can be defined based upon input provided by an employer of the user 104. The re-escalation rules 120 can be pre-defined in the SDEE application 116. New re-escalation rules 120 can be added as needed, modified as needed, and removed as needed. It is contemplated that re-escalation rules 120 may be governed by an entity other than the user device 102 such that such an entity can configure the security re-escalation rules 120 as needed and without prior approval by the user 104. Alternatively, approval by the user 104 may be required.

The security re-escalation rules 120 can be based, at least in part, on one or more other factors. Other factors may include location and/or time. For example, when the user 104 is at home, data typically in the second security tier 112B may be re-escalated to the third security tier 112C. The location can be determined by a location component of the user device 102. Geo-fence triggers and the like are also contemplated. An example location component is illustrated and described below with reference to FIG. 4.

In some embodiments, one or more of the security re-escalation rules 120 can be pre-configured for a specified time, time duration, event, manual trigger, and/or as a response to a threat or obscure action. For example, a time-based security re-escalation rule 120 may specify that after one hour, the data 106 can be re-escalated one security tier, and after two more hours, the data 106 can be re-escalated an additional security tier. An event-based security re-escalation rule 120 may specify that the data 106, or a portion thereof, is to be re-escalated after a certain person accesses the data 106; after the data 106 has been downloaded X number of times; after business hours; in response to a threat; after X number of failed access attempts; in response to higher than normal (e.g., above a certain threshold) CPU or other resource usage; in response to the detection of an intrusion, malware, virus, or other security vulnerability; if the user device 102 has moved outside of a normal pattern (e.g., home to work is a normal pattern; a sudden change in this may indicate the device has been stolen or is otherwise compromised); if a suspicious link on an email/text/chat is received; or if a manual trigger event is received, such as the user 104 manually requested that the data 106, or a portion thereof, be re-escalated for any reason.

From operation 204, the method 200 proceeds to operation 206. At operation 206, the user device 102 defines the multi-tiered security zone 110 within the user device file system 108. The user device file system 108 may be any type of file system, some examples of which include, but are not limited to, FAT32, Ext3, Ext4, exFAT, APFS, Linux file system, and the like. The multi-tiered security zone 110 can be a dedicated portion of the user device file system 108. The size (e.g., in bytes or any order of magnitude thereof) of the multi-tiered security zone 110 can be defined based upon the size of the data 106 and/or the number of security tiers 112. As described above, the multi-tiered security zone 110 is governed by the security rules 114. In some embodiments, the multi-tiered security zone 110 is defined by the application of one or more of the security rules 114 to the data 106 regardless of the physical location in memory where the data 106 is stored. In other embodiments, the multi-tiered security zone 110 is defined by a physical location in memory. Examples of memory are illustrated and described with reference to FIGS. 3, 4, and 6.

From operation 206, the method 200 proceeds to operation 208. At operation 208, the user device 102 identifies at least a portion of the data 106 for de-escalation. The user device 102 can identify the data 106 for de-escalation based upon input received from the user 104. For example, the user 104 may mark, for de-escalation, the data 106B initially assigned the second security tier 112B of the multi-tiered security zone 110 prior to de-escalation, such as via a function of a user interface (not shown), and may select the security de-escalation rule(s) 118 to be applied. The user device 102 can identify the data 106B for de-escalation based upon the data 106B being created, modified, or otherwise used by the SDEE application 116. The SDEE application 116 may be a standalone application, an operating system or portion thereof, a plug-in, a software extension, or other software module that provides the security de-escalation rules 118 that can be applied to the data 106 stored in the multi-tiered security zone 110.

From operation 208, the method 200 proceeds to operation 210. At operation 210, the user device 102 de-escalates the data 106B to generate de-escalated data 136 by storing the data 106B identified for de-escalation (at operation 208) in a less secure security tier 112 in the multi-tiered security zone 110. For example, the data 106B initially assigned the second security tier 112B that provides a second level of security (e.g., read-only access) can be assigned to the first security tier 112A that provides a first level of security (e.g., read/write access) that is less secure than the second level of security provided by the second security tier 112B.

From operation 210, the method 200 proceeds to operation 212. At operation 212, the user device 102 receives the data access request 134 from the external user device 126. The data access request 134 includes the data access credentials 122 previously shared by the user 104 with the external user 124 (e.g., out-of-band). The data access request 134 additionally can specify the data 106 to be accessed, or the data access credentials 122 can be used to access any and all of the data 106 available during de-escalation and for which the data access credentials 122 can be authenticated. In some embodiments, the user 104 may receive a text message, a chat message, an automated call, and/or another type of alert via the user device 102 to inform the user 104 that the security level for certain data has been de-escalated for a certain time period and/or under one or more other conditions.

From operation 212, the method 200 proceeds to operation 214. At operation 214, the user device 102 verifies the data access credentials 122. The user device 102 can compare the data access credentials 122 received in the data access request 134 to the data access credentials 122 known to the user device 102. The method 200 assumes that the user device 102 can verify the data access credentials 122. In the event the user device 102 cannot verify the data access credentials 122, the method 200 can end with or without notice provided to the external user device 126.

From operation 214, the method 200 proceeds to operation 216. At operation 216, the user device 102 provides the de-escalated data 136 to the external user device 126. The external user device 126 can store the de-escalated data 136 in memory in accordance with the external user device file system 138. In some embodiments, the de-escalated data 136 is permanently accessible after the data access credentials 122 have been verified. Alternatively, the user device 102 may include an expiration timer along with the de-escalated data 136 so that the de-escalated data 136 can be automatically deleted or otherwise rendered inaccessible by the external user device 126. In some embodiments, the external user device 126 may be required to re-negotiate access to the de-escalated data 136 using a further data access request 134 that includes the data access credentials 122 sent in the original data access request 134. Alternatively, new data access credentials 122 or additional data access credentials 122 may be required to re-negotiate access. In some other embodiments, the user device 102 may actively prompt the external user device 126 to delete the de-escalated data 136. This prompt may be dictated by one or more of the security de-escalation rules 118 and/or by one or more of the security re-escalation rules 120. The user device 102 may change the data access credentials 122 needed for access to the de-escalated data 136 as part of one or more re-escalation rules 120. In this manner, the external user device 126 will no longer have the data access credentials 122 needed to access the de-escalated data 136.

From operation 216, the method 200 proceeds to operation 218. At operation 218, the user device 102 implements the security re-escalation rule(s) 120 applicable to the de-escalated data 136. The de-escalated data 136 currently stored on the user device 102 can be re-escalated to the first security tier 112A to which it was originally assigned. For example, the de-escalated data 136 in the first security tier 112 may be re-escalated to the second security tier 112B and stored as the second data 106B. In this manner, the external user device 126 will no longer be able to access the de-escalated data 136.

From operation 218, the method 200 proceeds to operation 220. At operation 220, the method 200 can end.

Figure 3:
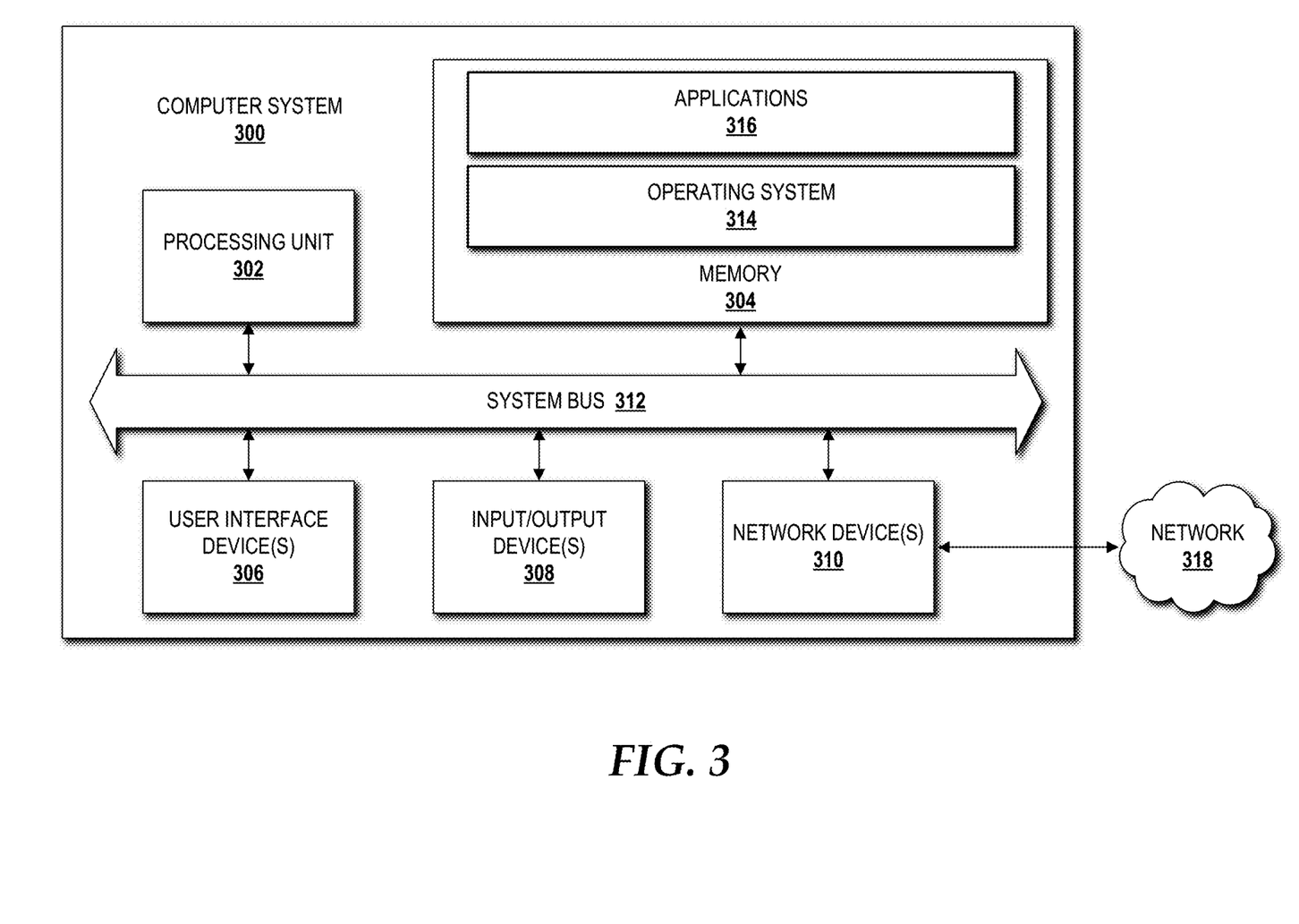
FIG. 3 is a block diagram illustrating an example computer system capable of implementing aspects of the embodiments presented herein.

FIG. 3 is a block diagram illustrating a computer system 300 configured to perform various operations disclosed herein. The computer system 300 includes a processing unit 302, a memory 304, one or more user interface devices 306, one or more input/output ("I/O") devices 308, and one or more network devices 310, each of which is operatively connected to a system bus 312. The system bus 312 enables bi-directional communication between the processing unit 302, the memory 304, the user interface devices 306, the I/O devices 308, and the network devices 310.

In some embodiments, the user device 102 and/or the external user device 126 is/are configured, at least in part, like the computer system 300. It should be understood, however, that the user device 102 and/or the external user device 126 might include additional functionality or include less functionality than now described.

The processing unit 302 might be a standard central processor that performs arithmetic and logical operations, a more specific purpose programmable logic controller ("PLC"), a programmable gate array, or other type of processor known to those skilled in the art and suitable for controlling the operation of the computer system 300. Processing units are generally known, and therefore are not described in further detail herein.

The memory 304 communicates with the processing unit 302 via the system bus 312. The memory 304 can be formatted, partitioned, or otherwise configured to utilize the user device file system 108/the external user device file system 138. The memory 304, embodied in the user device 102, can be used to store, in the multi-tiered security zone 110, the data 106A-106N in the security tiers 112A-112N, respectively. The memory 304, embodied in the external user device 126, can be used to store the de-escalated data 136. In some embodiments, the memory 304 is operatively connected to a memory controller (not shown) that enables communication with the processing unit 302 via the system bus 312. The illustrated memory 304 includes an operating system 314 and one or more applications 316 (e.g., the SDEE application 116). The operating system 314 can include the SDEE application 116 or can provide the functionality thereof. The operating system 314 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREE-BSD family of operating systems, the SOLARIS family of operating systems from ORACLE CORPORATION, other operating systems such as proprietary operating systems, and the like.

The user interface devices 306 may include one or more devices with which a user accesses the computer system 300. The user interface devices 306 may include, but are not limited to, computers, servers, personal digital assistants, telephones (e.g., cellular, IP, or landline), or any suitable computing devices. The I/O devices 308 enable a user to interface with the program modules. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, a touchscreen, or an electronic stylus. Further, the I/O devices 308 may include one or more output devices, such as, but not limited to, a display screen or a printer. An I/O device 308 embodied as a display screen can be used to present information, such as the data 106, the de-escalated data 136, a user interface for the SDEE application 116, and/or any other information disclosed herein to the user 104 or the external user 124 as the case may be.

The network devices 310 enable the computer system 300 to communicate with a network 318, which can be or can include the cloud network 128, the network 130, a network that facilitates the peer-to-peer connection 132, the Internet, or some combination thereof. Examples of the network devices 310 include, but are not limited to, a modem, a radio frequency ("RF") or infrared ("IR") transceiver, a telephonic interface, a bridge, a router, or a network card. The network 318 may include a wireless network such as, but not limited to, a WLAN such as a WI-FI network, a WWAN, a wireless PAN ("WPAN") such as BLUETOOTH, or a wireless MAN ("WMAN"). Alternatively, the network 318 may be a wired network such as, but not limited to, a WAN such as the Internet, a LAN such as the Ethernet, a wired PAN, or a wired MAN.

Figure 4:
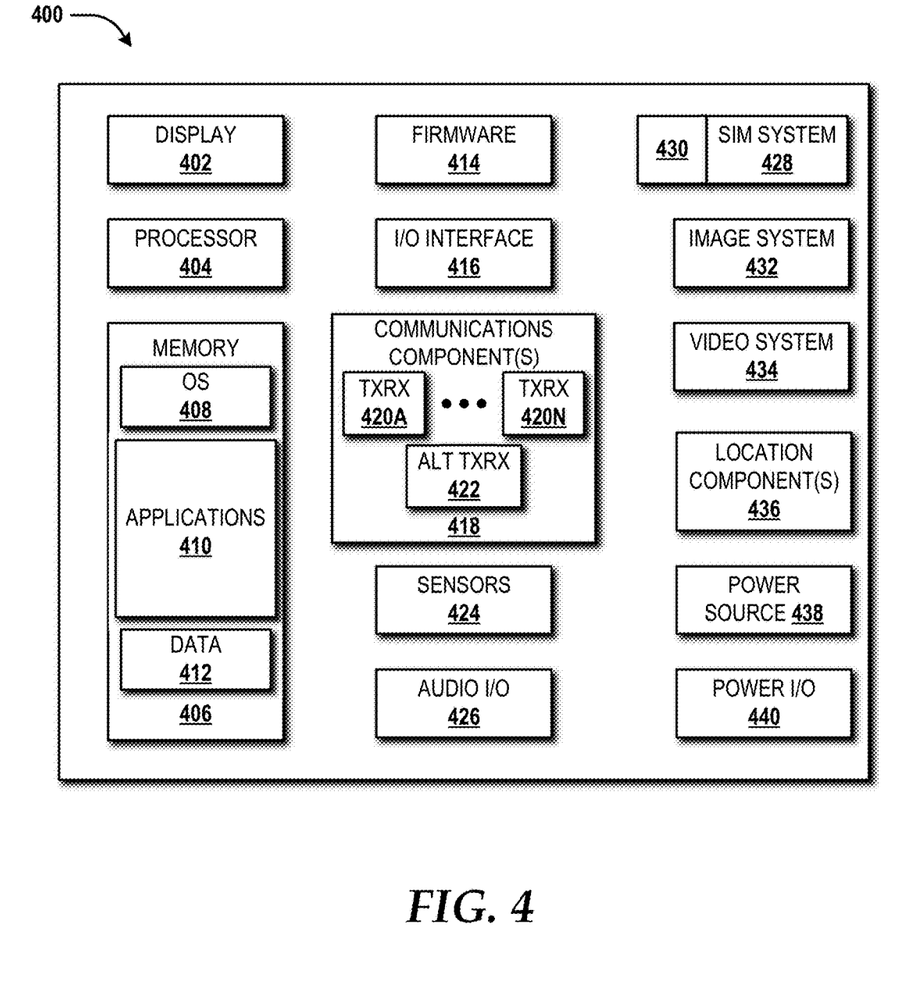
FIG. 4 is a block diagram illustrating an example mobile device capable of implementing aspects of the embodiments disclosed herein.

Turning now to FIG. 4, an illustrative mobile device 400 and components thereof will be described. In some embodiments, the user device 102 and/or the external user device 126 is/are configured, at least in part, like the mobile device 400. It should be understood, however, that the user device 102 and/or the external user device 126 might include additional functionality or include less functionality than now described.

While connections are not shown between the various components illustrated in FIG. 4, it should be understood that some, none, or all of the components illustrated in FIG. 4 can be configured to interact with one another to carry out various device functions. In some embodiments, the components are arranged so as to communicate via one or more busses (not shown). Thus, it should be understood that FIG. 4 and the following description are intended to provide a general understanding of a suitable environment in which various aspects of embodiments can be implemented, and should not be construed as being limiting in any way.

As illustrated in FIG. 4, the mobile device 400 can include a display 402 for displaying data. According to various embodiments, the display 402 can be configured to display the data 106A-106N, the de-escalated data 136A-136N, network connection information, various GUI elements (e.g., of the SDEE application 116), text, images, video, virtual keypads and/or keyboards, messaging data, notification messages, metadata, Internet content, device status, time, date, calendar data, device preferences, map and location data, combinations thereof, and/or the like. The mobile device 400 also can include a processor 404 and a memory or other data storage device ("memory") 406. The processor 404 can be configured to process data and/or can execute computer-executable instructions stored in the memory 406. The computer-executable instructions executed by the processor 404 can include, for example, an operating system 408, one or more applications 410, other computer-executable instructions stored in the memory 406, or the like. In some embodiments, the applications 410 also can include a UI application (not illustrated in FIG. 4).

The UI application can interface with the operating system 408 to facilitate user interaction with functionality and/or data stored at the mobile device 400 and/or stored elsewhere. In some embodiments, the operating system 408 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 404 to aid the user 104 in navigating the user device file system 108, aid the external user 124 in navigating the external user device file system 138, in data communications, entering/deleting data (e.g., the data 106A-106N), entering and setting user IDs and passwords for device access, configuring settings, manipulating content and/or settings, multimode interaction, interacting with other applications 410, and otherwise facilitating user interaction with the operating system 408, the applications 410, and/or other types or instances of data 412 that can be stored at the mobile device 400.

The applications 410, the data 412, and/or portions thereof can be stored in the memory 406 and/or in a firmware 414, and can be executed by the processor 404. The firmware 414 also can store code for execution during device power up and power down operations. It can be appreciated that the firmware 414 can be stored in a volatile or non-volatile data storage device including, but not limited to, the memory 406 and/or a portion thereof.

The mobile device 400 also can include an input/output ("I/O") interface 416. The I/O interface 416 can be configured to support the input/output of data such as location information, presence status information, user IDs, passwords, and application initiation (start-up) requests. In some embodiments, the I/O interface 416 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 400 can be configured to synchronize with another device to transfer content to and/or from the mobile device 400. In some embodiments, the mobile device 400 can be configured to receive updates to one or more of the applications 410 via the I/O interface 416, though this is not necessarily the case. In some embodiments, the I/O interface 416 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 416 may be used for communications between the mobile device 400 and a network device or local device.

The mobile device 400 also can include a communications component 418. The communications component 418 can be configured to interface with the processor 404 to facilitate wired and/or wireless communications with one or more networks, such as the cloud network 128, the network 130, a network that facilitates the peer-to-peer connection 132, the Internet, or some combination thereof. In some embodiments, the communications component 418 includes a multimode communications subsystem for facilitating communications via the cellular network and one or more other networks.

The communications component 418, in some embodiments, includes one or more transceivers. The one or more transceivers, if included, can be configured to communicate over the same and/or different wireless technology standards with respect to one another. For example, in some embodiments, one or more of the transceivers of the communications component 418 may be configured to communicate using Global System for Mobile communications ("GSM"), Code-Division Multiple Access ("CDMA") CDMAONE, CDMA2000, Long-Term Evolution ("LTE") LTE, and various other 2G, 2.5G, 3G, 4G, 4.5G, 5G, and greater generation technology standards. Moreover, the communications component 418 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiple Access ("OFDMA"), Space-Division Multiple Access ("SDMA"), and the like.

In addition, the communications component 418 may facilitate data communications using General Packet Radio Service ("GPRS"), Enhanced Data services for Global Evolution ("EDGE"), the High-Speed Packet Access ("HSPA") protocol family including High-Speed Downlink Packet Access ("HSDPA"), Enhanced Uplink ("EUL") (also referred to as High-Speed Uplink Packet Access ("HSUPA"), HSPA+, and various other current and future wireless data access standards. In the illustrated embodiment, the communications component 418 can include a first transceiver ("TxRx") 420A that can operate in a first communications mode (e.g., GSM). The communications component 418 also can include an $N^{th}$ transceiver ("TxRx") 420N that can operate in a second communications mode relative to the first transceiver 420A (e.g., UMTS). While two transceivers 420A-420N (hereinafter collectively and/or generically referred to as "transceivers 420") are shown in FIG. 4, it should be appreciated that less than two, two, and/or more than two transceivers 420 can be included in the communications component 418.

The communications component 418 also can include an alternative transceiver ("Alt TxRx") 422 for supporting other types and/or standards of communications. According to various contemplated embodiments, the alternative transceiver 422 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 418 also can facilitate reception from terrestrial radio networks, digital satellite radio networks, internet-based radio service networks, combinations thereof, and the like. The communications component 418 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 400 also can include one or more sensors 424. The sensors 424 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 400 may be provided by an audio I/O component 426. The audio I/O component 426 of the mobile device 400 can include one or more speakers for the output of audio signals, one or more microphones for the collection and/or input of audio signals, and/or other audio input and/or output devices.

The illustrated mobile device 400 also can include a subscriber identity module ("SIM") system 428. The SIM system 428 can include a universal SIM ("USIM"), a universal integrated circuit card ("UICC") and/or other identity devices. The SIM system 428 can include and/or can be connected to or inserted into an interface such as a slot interface 430. In some embodiments, the slot interface 430 can be configured to accept insertion of other identity cards or modules for accessing various types of networks. Additionally, or alternatively, the slot interface 430 can be configured to accept multiple subscriber identity cards. Because other devices and/or modules for identifying users and/or the mobile device 400 are contemplated, it should be understood that these embodiments are illustrative, and should not be construed as being limiting in any way.

The mobile device 400 also can include an image capture and processing system 432 ("image system"). The image system 432 can be configured to capture or otherwise obtain photos, videos, and/or other visual information. As such, the image system 432 can include cameras, lenses, charge-coupled devices ("CCDs"), combinations thereof, or the like. The mobile device 400 may also include a video system 434. The video system 434 can be configured to capture, process, record, modify, and/or store video content. Photos and videos obtained using the image system 432 and the video system 434, respectively, may be added as message content to an MMS message, email message, and sent to another device. The video and/or photo content also can be shared with other devices via various types of data transfers via wired and/or wireless communication devices as described herein.

The mobile device 400 also can include one or more location components 436. The location components 436 can be configured to send and/or receive signals to determine a geographic location of the mobile device 400. According to various embodiments, the location components 436 can send and/or receive signals from global positioning system ("GPS") devices, assisted-GPS ("A-GPS") devices, WI-FI/WIMAX and/or cellular network triangulation data, combinations thereof, and the like. The location component 436 also can be configured to communicate with the communications component 418 to retrieve triangulation data for determining a location of the mobile device 400. In some embodiments, the location component 436 can interface with cellular network nodes, telephone lines, satellites, location transmitters and/or beacons, wireless network transmitters and receivers, combinations thereof, and the like. In some embodiments, the location component 436 can include and/or can communicate with one or more of the sensors 424 such as a compass, an accelerometer, and/or a gyroscope to determine the orientation of the mobile device 400. Using the location component 436, the mobile device 400 can generate and/or receive data to identify its geographic location, or to transmit data used by other devices to determine the location of the mobile device 400. The location component 436 may include multiple components for determining the location and/or orientation of the mobile device 400.

The illustrated mobile device 400 also can include a power source 438. The power source 438 can include one or more batteries, power supplies, power cells, and/or other power subsystems including alternating current ("AC") and/or direct current ("DC") power devices. The power source 438 also can interface with an external power system or charging equipment via a power I/O component 440. Because the mobile device 400 can include additional and/or alternative components, the above embodiment should be understood as being illustrative of one possible operating environment for various embodiments of the concepts and technologies described herein. The described embodiment of the mobile device 400 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 400 or other devices or computers described herein, such as the computer system 300 described above with reference to FIG. 3. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 400 in order to store and execute the software components presented herein. It is also contemplated that the mobile device 400 may not include all of the components shown in FIG. 4, may include other components that are not explicitly shown in FIG. 4, or may utilize an architecture completely different than that shown in FIG. 4.

Figure 5:
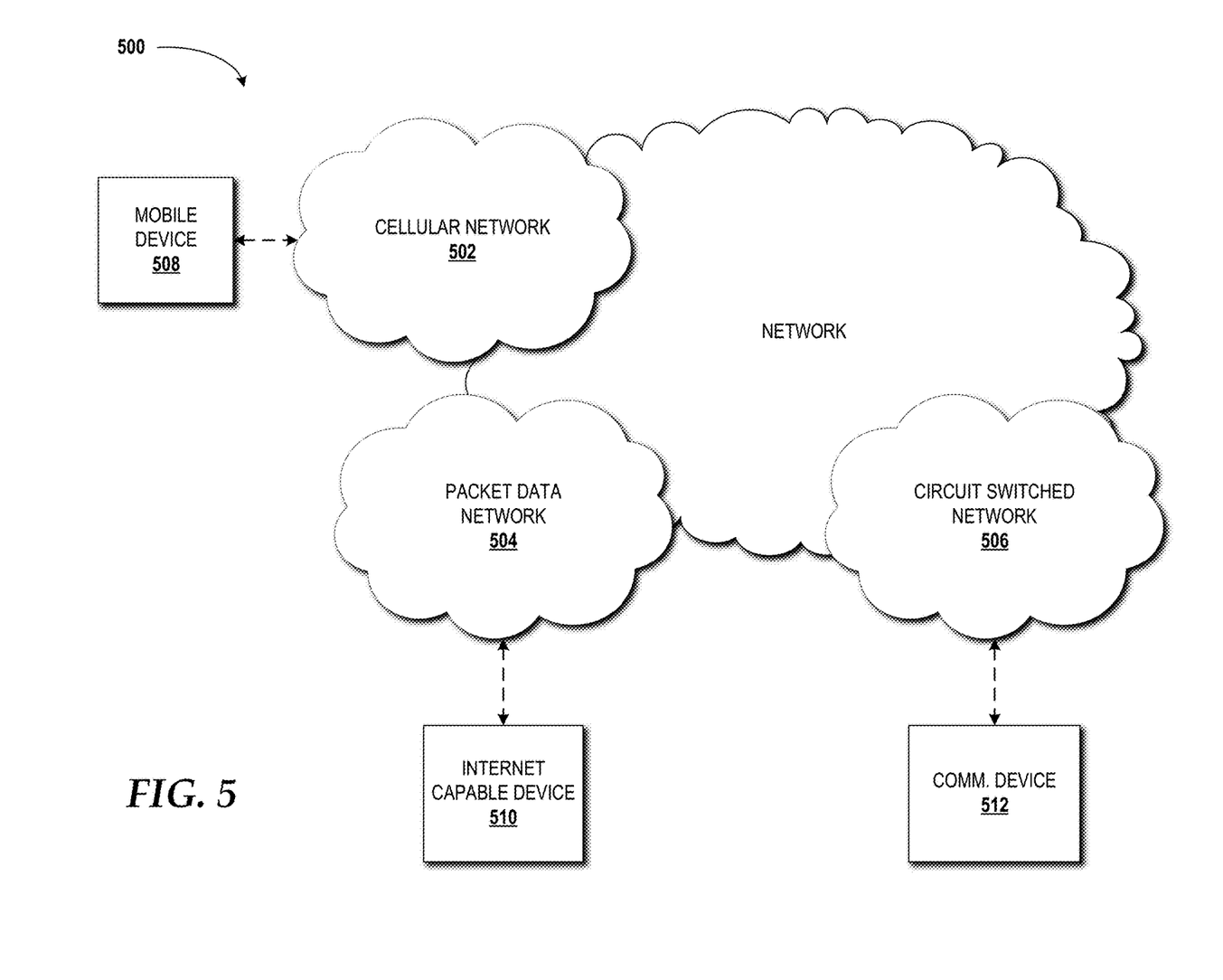
FIG. 5 is a diagram illustrating a network, according to an illustrative embodiment.

Turning now to FIG. 5, details of a network 500 are illustrated, according to an illustrative embodiment. The network 130 (FIG. 1) can be or can include at least a portion of the network 500. The network 500 includes a cellular network 502, a packet data network 504, and a circuit switched network 506 (e.g., a public switched telephone network).

The cellular network 502 includes various components such as, but not limited to, base transceiver stations ("BTSs"), Node-Bs or e-Node-Bs, base station controllers ("B SCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, the user device 102, the external user device 126, a cellular telephone, a user equipment, a mobile terminal, a PDA, a laptop computer, a handheld computer, and combinations thereof, can be operatively connected to the cellular network 502. The cellular network 502 can be configured as a GSM network and can provide data communications via GPRS and/or EDGE. Additionally, or alternatively, the cellular network 502 can be configured as a 3G Universal Mobile Telecommunications System ("UMTS") network and can provide data communications via the HSPA protocol family, for example, HSDPA, EUL, and HSPA+. The cellular network 502 also is compatible with 4G mobile communications standards such as LTE, or the like, as well as evolved and future mobile standards.

The packet data network 504 includes various devices, for example, one or more of the user device 102, the external user device 126, other servers, other systems, computers, databases, and other devices in communication with one another, as is generally known. In some embodiments, the packet data network 504 is or includes one or more WI-FI networks, each of which can include one or more WI-FI access points, routers, switches, and other WI-FI network components. The packet data network 504 devices are accessible via one or more network links. The servers often store various files that are provided to a requesting device such as, for example, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system ("POTS"). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, the user device 102, the external user device 126, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510.

Figure 6:
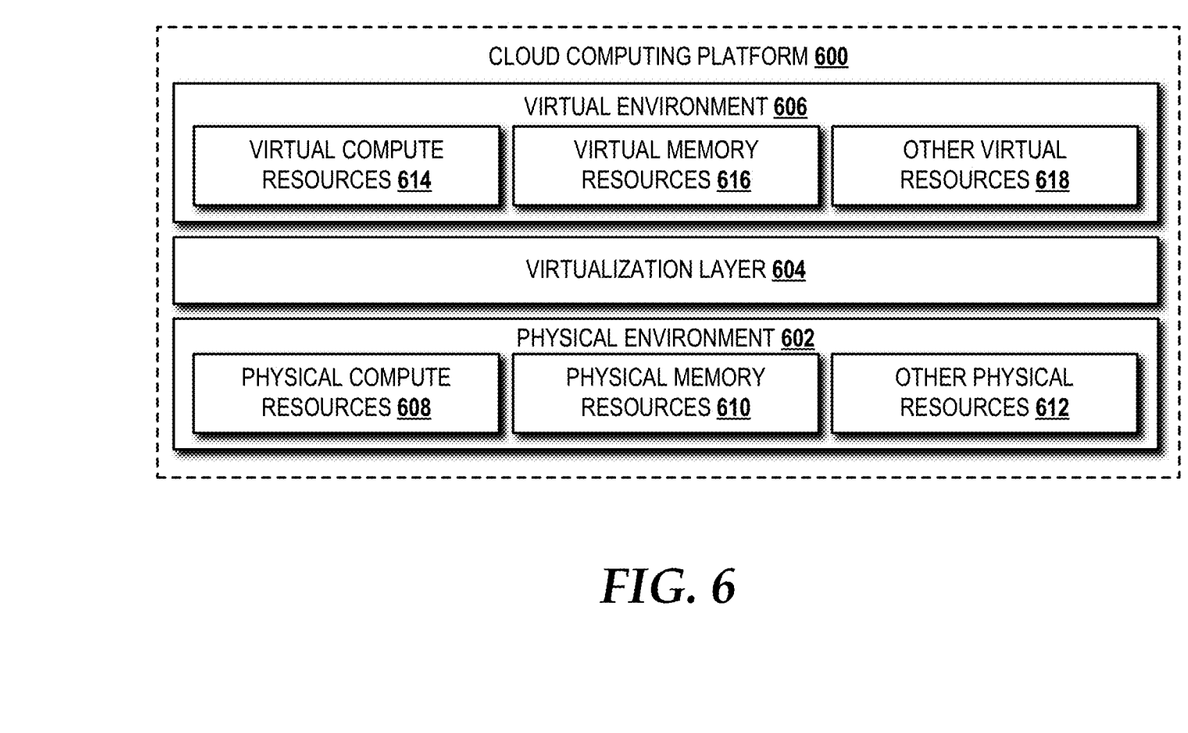
FIG. 6 is a diagram illustrating a cloud computing platform capable of implementing aspects of the embodiments disclosed herein.

Turning now to FIG. 6, an illustrative cloud computing platform 600 will be described, according to an illustrative embodiment. The cloud network 128 can be implemented on the cloud computing platform 600. The cloud computing platform 600 includes a physical environment 602, a virtualization layer 604, and a virtual environment 606. While no connections are shown in FIG. 6, it should be understood that some, none, or all of the components illustrated in FIG. 6 can be configured to interact with one other to carry out various functions described herein. In some embodiments, the components are arranged so as to communicate via one or more networks. Thus, it should be understood that FIG. 6 and the remaining description are intended to provide a general understanding of a suitable environment in which various aspects of the embodiments described herein can be implemented, and should not be construed as being limiting in any way.

The physical environment 602 provides hardware resources that, in the illustrated embodiment, include one or more physical compute resources 608, one or more physical memory resources 610, and one or more other physical resources 612. The physical compute resource(s) 608 can include one or more hardware components that perform computations to process data and/or to execute computer-executable instructions of one or more application programs, one or more operating systems, and/or other software. The physical compute resources 608 can include one or more central processing units ("CPUs") configured with one or more processing cores. The physical compute resources 608 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the physical compute resources 608 can include one or more discrete GPUs. In some other embodiments, the physical compute resources 608 can include CPU and GPU components that are configured in accordance with a co-processing CPU/GPU computing model, wherein the sequential part of an application executes on the CPU and the computationally-intensive part is accelerated by the GPU processing capabilities. The physical compute resources 608 can include one or more system-on-chip ("SoC") components along with one or more other components, including, for example, one or more of the physical memory resources 610, and/or one or more of the other physical resources 612. In some embodiments, the physical compute resources 608 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The physical compute resources 608 can be or can include one or more hardware components architected in accordance with an ARM architecture, available for license from ARM HOLDINGS of Cambridge, United Kingdom. Alternatively, the physical compute resources 608 can be or can include one or more hardware components architected in accordance with an x86 architecture, such an architecture available from INTEL CORPORATION of Mountain View, Calif., and others. Those skilled in the art will appreciate the implementation of the physical compute resources 608 can utilize various computation architectures, and as such, the physical compute resources 608 should not be construed as being limited to any particular computation architecture or combination of computation architectures, including those explicitly disclosed herein.

The physical memory resource(s) 610 can include one or more hardware components that perform storage/memory operations, including temporary or permanent storage operations. In some embodiments, the physical memory resource(s) 610 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the physical compute resources 608.

The other physical resource(s) 612 can include any other hardware resources that can be utilized by the physical compute resources(s) 608 and/or the physical memory resource(s) 610 to perform operations described herein. The other physical resource(s) 612 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The physical resources operating within the physical environment 602 can be virtualized by one or more virtual machine monitors (not shown; also known as "hypervisors") operating within the virtualization/control layer 604 to create virtual resources that reside in the virtual environment 606. The virtual machine monitors can be or can include software, firmware, and/or hardware that alone or in combination with other software, firmware, and/or hardware, creates and manages virtual resources operating within the virtual environment 606.

The virtual resources operating within the virtual environment 606 can include abstractions of at least a portion of the physical compute resources 608, the physical memory resources 610, and/or the other physical resources 612, or any combination thereof, shown as virtual compute resources 614, virtual memory resources 616, and other virtual resources 618, respectively. In some embodiments, the abstractions can include one or more virtual machines upon which one or more applications can be executed.

Based on the foregoing, it should be appreciated that concepts and technologies for security de-escalation for data access have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

The invention claimed is:

1. A method comprising:
  defining, by a user device comprising a processor and a memory, a security de-escalation rule;
  defining, by the user device, a multi-tiered security zone within a user device file system utilized by the memory, wherein the multi-tiered security zone comprises a plurality of security tiers;

identifying, by the user device, data associated with a second security tier of the plurality of security tiers for de-escalation in accordance with the security de-escalation rule; and de-escalating, by the user device, the data associated with the second security tier to generate de-escalated data by storing, by the user device, the data identified for de-escalation in a first security tier of the plurality of security tiers, wherein the first security tier is less secure than the second security tier.

2. The method of claim 1, further comprising:

receiving, by the user device, a data access request from an external user device, wherein the data access request comprises a data access credential;

verifying, by the user device, the data access credential; and providing, by the user device, the de-escalated data to the external user device.

3. The method of claim 2, further comprising:

defining, by the user device, a security re-escalation rule; and implementing, by the user device, the security re-escalation rule to re-escalate the de-escalated data from the first security tier to the second security tier.

4. The method of claim 2, wherein:

receiving, by the user device, the data access request from the external user device comprises receiving, by the user device, the data access request from the external user device via a network, a cloud network, or a peer-to-peer connection; and providing, by the user device, the de-escalated data to the external user device comprises providing, by the user device, the de-escalated data to the external user device via the network, the cloud network, or the peer-to-peer connection.

5. The method of claim 1, wherein defining, by the user device, the multi-tiered security zone within the user device file system utilized by the memory comprises defining, by the user device, in accordance with a security rule, the multi-tiered security zone within the user device file system utilized by the memory.

6. The method of claim 1, wherein the security de-escalation rule comprises an expiration timer.

7. The method of claim 1, wherein identifying, by the user device, the data for de-escalation in accordance with the security de-escalation rule comprises identifying, by the user device, the data for de-escalation in accordance with the security de-escalation rule based upon input received from a user of the user device.

8. A computer-readable storage medium having computer-executable instructions stored thereon that, when executed by a processor of a user device, cause the user device to perform operations comprising:

defining a security de-escalation rule;

defining a multi-tiered security zone within a user device file system utilized by a memory of the user device, wherein the multi-tiered security zone comprises a plurality of security tiers;

identifying data associated with a second security tier of the plurality of security tiers for de-escalation in accordance with the security de-escalation rule; and de-escalating the data associated with the second security tier to generate de-escalated data by storing the data identified for de-escalation in a first security tier of the plurality of security tiers, wherein the first security tier is less secure than the second security tier.

9. The computer-readable storage medium of claim 8, wherein the operations further comprise:

receiving a data access request from an external user device, wherein the data access request comprises a data access credential;

verifying the data access credential; and providing the de-escalated data to the external user device.

10. The computer-readable storage medium of claim 9, wherein the operations further comprise:

defining a security re-escalation rule; and implementing the security re-escalation rule to re-escalate the de-escalated data from the first security tier to the second security tier.

11. The computer-readable storage medium of claim 9, wherein:

receiving the data access request from the external user device comprises receiving the data access request from the external user device via a network, a cloud network, or a peer-to-peer connection; and providing the de-escalated data to the external user device comprises providing the de-escalated data to the external user device via the network, the cloud network, or the peer-to-peer connection.

12. The computer-readable storage medium of claim 8, wherein defining the multi-tiered security zone within the user device file system utilized by the memory comprises defining, in accordance with a security rule, the multi-tiered security zone within the user device file system utilized by the memory.

13. The computer-readable storage medium of claim 8, wherein the security de-escalation rule comprises an expiration timer.

14. The computer-readable storage medium of claim 8, wherein identifying the data for de-escalation in accordance with the security de-escalation rule comprises identifying, by the user device, the data for de-escalation in accordance with the security de-escalation rule based upon input received from a user of the user device.

15. A user device comprising:

a processor; and a memory comprising instructions that, when executed by the processor, cause the processor to perform operations comprising defining a security de-escalation rule, defining a multi-tiered security zone within a user device file system utilized by the memory of the user device, wherein the multi-tiered security zone comprises a plurality of security tiers, identifying data associated with a second security tier of the plurality of security tiers for de-escalation in accordance with the security de-escalation rule, and de-escalating the data associated with the second security tier to generate de-escalated data by storing the data identified for de-escalation in a first security tier of the plurality of security tiers, wherein the first security tier is less secure than the second security tier.

16. The user device of claim 15, wherein the operations further comprise:

receiving a data access request from an external user device, wherein the data access request comprises a data access credential;

verifying the data access credential; and providing the de-escalated data to the external user device.

17. The user device of claim 16, wherein the operations further comprise:
  defining a security re-escalation rule; and
  implementing the security re-escalation rule to re-escalate the de-escalated data from the first security tier to the second security tier.

18. The user device of claim 16, wherein:
  receiving the data access request from the external user device comprises receiving the data access request from the external user device via a network, a cloud network, or a peer-to-peer connection; and
  providing the de-escalated data to the external user device comprises providing the de-escalated data to the external user device via the network, the cloud network, or the peer-to-peer connection.

19. The user device of claim 15, wherein defining the multi-tiered security zone within the user device file system utilized by the memory comprises defining, in accordance with a security rule, the multi-tiered security zone within the user device file system utilized by the memory.

20. The user device of claim 15, wherein identifying the data for de-escalation in accordance with the security de-escalation rule comprises identifying, by the user device, the data for de-escalation in accordance with the security de-escalation rule based upon input received from a user of the user device.

* * * * *